(12) United States Patent
Lee et al.

(10) Patent No.: US 10,712,843 B2
(45) Date of Patent: Jul. 14, 2020

(54) METHOD AND APPARATUS FOR CONTROLLING DISPLAY OF SCROLLED CONTENT BY MODIFYING THE CONTENT AS THE CONTENT IS BEING SCROLLED TO A DESIGNED LOCATION AND COMPUTER PROGRAM FOR EXECUTING THE METHOD

(71) Applicant: NAVER Corporation, Seongnam-si (KR)

(72) Inventors: Sun Lee, Seongnam-si (KR); Hong Youp Chu, Seongnam-si (KR); Won Suk Lim, Seongnam-si (KR); Jung Sik Kim, Seongnam-si (KR); Jae Yeon Lee, Seongnam-si (KR); Woo Sik Byun, Seongnam-si (KR); Chae Yun Cho, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 674 days.

(21) Appl. No.: 14/728,319

(22) Filed: Jun. 2, 2015

(65) Prior Publication Data

US 2016/0035119 A1 Feb. 4, 2016

(30) Foreign Application Priority Data

Jul. 29, 2014 (KR) .................. 10-2014-0096613
Sep. 1, 2014 (KR) .................. 10-2014-0115524

(51) Int. Cl.
*G06F 3/041* (2006.01)
*G06F 3/0485* (2013.01)
*H04N 21/431* (2011.01)

(52) U.S. Cl.
CPC ............ *G06F 3/041* (2013.01); *G06F 3/0485* (2013.01); *H04N 21/4312* (2013.01)

(58) Field of Classification Search
None
See application file for complete search history.

(56) References Cited

U.S. PATENT DOCUMENTS 8,893,036 B1 * 11/2014 Wabyick ............... G06F 3/0485
715/785
2005/0057377 A1 * 3/2005 Naimer .................. G01O 23/00
340/978

(Continued)

FOREIGN PATENT DOCUMENTS

KR 2010-0063553 A 6/2010
KR 10-2011-0054415 A 5/2011

(Continued)

OTHER PUBLICATIONS

Korean Office Action issued in corresponding Korean patent application No. 10-2014-0115524, dated Sep. 18, 2015.

(Continued)

*Primary Examiner* — Cesar B Paula
*Assistant Examiner* — John M Heffington
(74) *Attorney, Agent, or Firm* — Greer, Burns & Crain Ltd.

(57) ABSTRACT

A display control method includes displaying at least a portion of a page, in which one or more content regions including contents are arranged, on a screen image; recognizing a scrolling operation with respect to the page; and scrolling the page based on the scrolling operation and applying an animation with respect to content included in a content region exposed on the screen image as the page is scrolled.

16 Claims, 16 Drawing Sheets

(56) References Cited

U.S. PATENT DOCUMENTS

| | | | |
|---|---|---|---|
| 2007/0024916 A1* | 2/2007 | Choi | G06F 3/04845 358/3.29 |
| 2007/0278320 A1* | 12/2007 | Lunacek | G05D 23/1902 236/94 |
| 2008/0062141 A1* | 3/2008 | Chandhri | G06F 3/0482 345/173 |
| 2008/0134018 A1* | 6/2008 | Kembel | G06F 17/30899 715/234 |
| 2010/0012019 A1* | 1/2010 | Chesne | G01C 23/00 116/284 |
| 2010/0125786 A1* | 5/2010 | Ozawa | G06F 3/04845 715/702 |
| 2011/0096097 A1* | 4/2011 | Matsuki | G03G 15/5016 345/684 |
| 2011/0115728 A1 | 5/2011 | Kwak et al. | |
| 2011/0263298 A1 | 10/2011 | Park | |
| 2012/0060129 A1 | 3/2012 | Jang | |
| 2012/0229514 A1* | 9/2012 | Mozafari | G06Q 10/109 345/653 |
| 2012/0274662 A1* | 11/2012 | Kim | G06F 3/0488 345/650 |
| 2014/0149922 A1* | 5/2014 | Hauser | G06F 3/0485 715/784 |
| 2014/0344712 A1* | 11/2014 | Okazawa | G06F 3/048 715/752 |
| 2015/0339006 A1* | 11/2015 | Chaland | G06F 3/0482 715/835 |
| 2016/0299654 A1* | 10/2016 | Mai | G06F 3/0485 |

FOREIGN PATENT DOCUMENTS

| | | |
|---|---|---|
| KR | 10-2011-0117978 A | 10/2011 |
| KR | 10-2012-0023867 A | 3/2012 |
| KR | 10-2014-0027823 A | 3/2014 |

OTHER PUBLICATIONS

Korean Office Action issued in corresponding Korean patent application No. 10-2014-0115524, dated Mar. 28, 2016.

Official Action issued by the Korean Industrial Property Office in corresponding Korean Patent App. No. 10-20140-096613, dated May 29, 2015.

\* cited by examiner

METHOD AND APPARATUS FOR CONTROLLING DISPLAY OF SCROLLED CONTENT BY MODIFYING THE CONTENT AS THE CONTENT IS BEING SCROLLED TO A DESIGNED LOCATION AND COMPUTER PROGRAM FOR EXECUTING THE METHOD

RELATED APPLICATION

This application claims the benefit of Korean Patent Application No. 10-2014-0096613 filed on Jul. 29, 2014, and Korean Patent Application No. 10-2014-0115524 filed on Sep. 1, 2014, the disclosures of which are incorporated herein in their entirety by reference.

BACKGROUND

1. Field

One or more exemplary embodiments of the present invention relate to a display control apparatus, a display control method, and a computer readable recording medium having recorded thereon a computer program for implementing the display control method.

2. Description of the Related Art

Scrolling refers to sliding a page displayed on a screen or a panel in a horizontal direction and/or a vertical direction. An amount of information equivalent to a slid out portion of the page (i.e., the portion of the page that moves outside the display area of a screen or a panel) appears from an end of the screen or a panel opposite to the end to which the page is slid in. Since an amount of information displayed on a page is larger than an amount of information that may be displayed within a single screen image, a scrolling function is frequently used. Information displayed on a screen image is read by performing scrolling. Most of display devices in consoles, word processors, mobile terminals, and personal computers have a scroll function.

If an external device, such as a mouse, is provided, scrolling may be performed by moving a wheel or dragging a scroll bar. If a touch panel is provided, scrolling may be performed by directly clicking or dragging a page displayed on a screen.

SUMMARY

One or more exemplary embodiments of the present invention include a display control apparatus and a display control method for applying visual effects to a scrolling operation and a computer readable recording medium having recorded thereon a computer program for implementing the display control method on a computer.

Additional aspects will be set forth in part in the description which follows and, in part, will be apparent from the description, or may be learned by practice of the presented embodiments.

According to one or more exemplary embodiments, a display control method includes displaying at least a portion of a page, in which one or more content regions including contents are arranged, on a screen image; recognizing a scrolling operation with respect to the page; and scrolling the page based on the scrolling operation and applying an animation with respect to content included in a content region exposed on the screen image as the page is scrolled.

According to one or more exemplary embodiments, a display control apparatus includes a scroll recognizing unit, which recognizes a scrolling operation with respect to a page including one or more content regions; a display control unit, which displays at least a portion of a page on a screen image, scrolls the page based on the scrolling operation, and applies an animation with respect to content included in a content region exposed on the screen image as the page is scrolled; and an animation generating unit, which generates the animation based on the scrolling operation or the scrolling of the page.

According to one or more exemplary embodiments, there is provided a computer readable recording medium having recorded thereon a computer program for implementing the display control method.

BRIEF DESCRIPTION OF THE DRAWINGS

These and/or other aspects will become apparent and more readily appreciated from the following description of the embodiments of the present invention, taken in conjunction with the accompanying drawings in which.

DETAILED DESCRIPTION

Figure 1A:
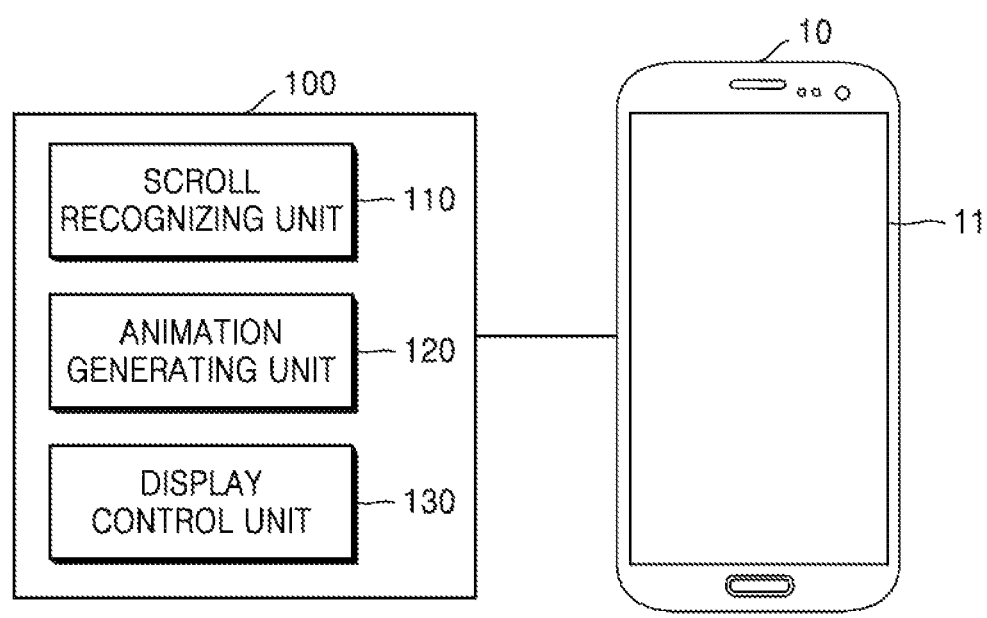
FIG. 1A is a schematic diagram showing a display control apparatus according to one embodiment.

Reference will now be made in detail to the embodiments of the present invention, examples of which are illustrated in the accompanying drawings, wherein like reference numerals refer to like elements throughout. In this regard, the present embodiments may have different forms and should not be construed as being limited to the descriptions set forth herein. Accordingly, the exemplary embodiments are described below, by referring to the figures, to explain the aspects of the present invention. As used herein, the term "and/or" includes any and all combinations of one or more of the associated listed items. Expressions such as "at least one of," when preceding a list of elements, modify the entire list of elements and do not modify the individual elements of the list.

As the inventive concept allows for various changes and numerous embodiments, particular embodiments will be illustrated in the drawings and described in detail in the written description. However, this is not intended to limit the present inventive concept to particular modes of practice, and it is to be appreciated that all changes, equivalents, and substitutes that do not depart from the spirit and technical scope of the present inventive concept are encompassed in the present inventive concept. In the description of the present inventive concept, certain detailed explanations of the related art are omitted when it is deemed that they may unnecessarily obscure the essence of the inventive concept.

Hereinafter, the present inventive concept will be described in detail by explaining preferred embodiments of the inventive concept with reference to the attached drawings. Like reference numerals in the drawings denote like elements.

It will be understood that although the terms "first", "second", etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components.

FIG. 1A is a schematic diagram showing a display control apparatus 100 according to an embodiment of the present invention.

The display control apparatus 100 may correspond to at least one processor or may include at least one processor. Therefore, the display control apparatus 100 may be integrated with another hardware device, such as a microprocessor or a computer system. For example, the display control apparatus 100 may be included in a terminal including a display unit capable of displaying a screen image.

In FIG. 1A, only components of the display control apparatus 100 related to the present embodiment are shown to not to obscure the essence of the present embodiment. Therefore, it will be obvious to one of ordinary skill in the art that the display control apparatus 100 may further include general purpose components other than the components shown in FIG. 1A.

The display control apparatus 100 controls displaying of a screen image 11 on a terminal 10. When a page displayed on the screen image 11 is scrolled, the display control apparatus 100 may control displaying of the page. For example, when new contents are exposed on the screen image 11 as the page is scrolled, the display control apparatus 100 may apply an animation to the newly exposed contents. The display control apparatus 100 includes a scroll recognizing unit 110, an animation generating unit 120, and a display control unit 130.

The scroll recognizing unit 110 recognizes a scrolling operation input from a user. The scroll recognizing unit 110 recognizes the speed, the direction, and the location of the scrolling page. A scrolling operation may be input via a touch operation using a touch panel, e.g., a drag, a gesture, a motion, etc., via an external input device, such as a wheel of a mouse, a joypad, etc., or via a scroll bar displayed on a screen image. However, the inventive concept is not limited thereto.

The display control unit 130 scrolls a page displayed on the screen image 11 based on a recognized scrolling operation. The display control unit 130 may apply a designated animation to content included in the page being scrolled. For example, if content that is newly exposed on a screen image as a page displayed thereon is scrolled, the display control unit 130 may apply an animation to the content, thereby providing a visual effect to the exposure of the content. Therefore, the newly exposed content may draw attention of a user, and a visual effect is provided by scrolling a page, thereby improving user's visual interest.

For example, a page displayed on a screen image may consist of a plurality of content regions, where each of the content regions may include content. The display control unit 130 may apply an animation to content included in a content region displayed on the screen image as the page is scrolled.

When a page is scrolled, the display control unit 130 according to an embodiment may display an icon to move to an end of the page in a direction in which the page is being scrolled on a screen image. For example, when a page is scrolled upward, the display control unit 130 may display a "top" icon to move to the top end of the page at the upper end of the screen image. The icon may be set to automatically disappear as a designated reference time is elapsed after the scrolling operation is ceased.

The display control unit 130 may provide various display interfaces other than a scrolling function. For example, when a user continuously clicks a particular content region, the display control unit 130 may enlarge the clicked content region, thereby indicating that the corresponding content region is selected. However, the inventive concept is not limited thereto. For example, if a user continuously clicks a particular content region, the display control unit 130 may indicate that the corresponding content region is selected by applying a display effect, such as shrinking the clicked content region or shrinking and enlarging the clicked content region. However, if a content region is continuously clicked for more than a designated critical time, enlarging or shrinking of the content region may be canceled.

The animation generating unit 120 generates an animation to be applied to the content. The animation generating unit 120 generates an animation to be applied to content based on a user's scrolling operation or the speed of scrolling a page based on the scrolling operation. The animation may include an operation for moving content. For example, the operation may move the content from a starting point to a designated location in a content region. When the animation is applied, the content may be move on the page along with the animation independently from scrolling of the page on the screen image.

The animation generating unit 120 according to an embodiment may determine at least one of the speed, the distance, the time, and the direction for moving content based on a speed of a scrolling operation or the speed of scrolling a page based on the scrolling operation. For example, the animation generating unit 120 may determine at least one of the speed, the distance, the time, and the direction for moving content to be proportional to the speed of a scrolling operation or the speed of scrolling a page based on the scrolling operation. The direction for moving content may be set to be identical to the direction in which a page is scrolled.

An animation generated according to an embodiment may be applied not only to a case in which a screen image is scrolled, but also to a case in which content outside the screen image is displayed in the screen image as the screen image is shrunk. In this case, a direction for moving the content may be set to be identical to a direction in which the content enters into the screen image. For example, if a plurality of contents that were outside the four ends of a screen image enter into the screen image as the screen image is shrunk, a moving animation may be applied to the plurality of contents, and each direction for moving each content may be set to be identical to each direction in which each content enters into the screen image, respectively. When an animation is applied, a visual effect equivalent to acceleration of movement of content occurs.

The animation generating unit 120 according to an embodiment may set a pre-set fixed time as a time for moving content, set a speed of a scrolling operation or a speed of scrolling a page as a speed for moving content, and calculate a distance for moving content based on the set moving time and the set moving speed.

The animation generating unit 120 may set a pre-set fixed distance as a distance for moving content and may set a speed for moving content based on a speed of a scrolling operation or a speed of scrolling the page.

The animation generating unit 120 may set a speed of moving content to be accelerated or decelerated as the content is moved and set an average speed of moving the content based on the speed of a scrolling operation or a speed of scrolling the page.

The animation generating unit 120 according to an embodiment may generate an animation for gradually changing transparency of content from a first transparency to a second transparency. For example, the first transparency may be 50% transparency, and the second transparency may be 0% transparency. Here, 0% transparency is interpreted to an opaque state, whereas 100% transparency is interpreted to a transparent state.

The animation generating unit 120 may generate an animation for gradually changing the size of content. The animation may include an operation for changing the size of the content to be gradually increased from a size smaller than the original size of the content to the original size of the content. A speed for changing the size of content may be set in proportion to the speed of a scrolling operation or a speed of scrolling the page. For example, the animation generating unit 120 may generate an animation for changing the size of content from 80% to 100%.

The animation generating unit 120 according to an embodiment may include an effect for replacing data included in content with a pattern or a background that is stored in advance. While an animation is being applied to content, data included in the content may be replaced with a pattern or a background that is stored in advance, and thus the data included in the content may not be displayed.

Figure 1B:
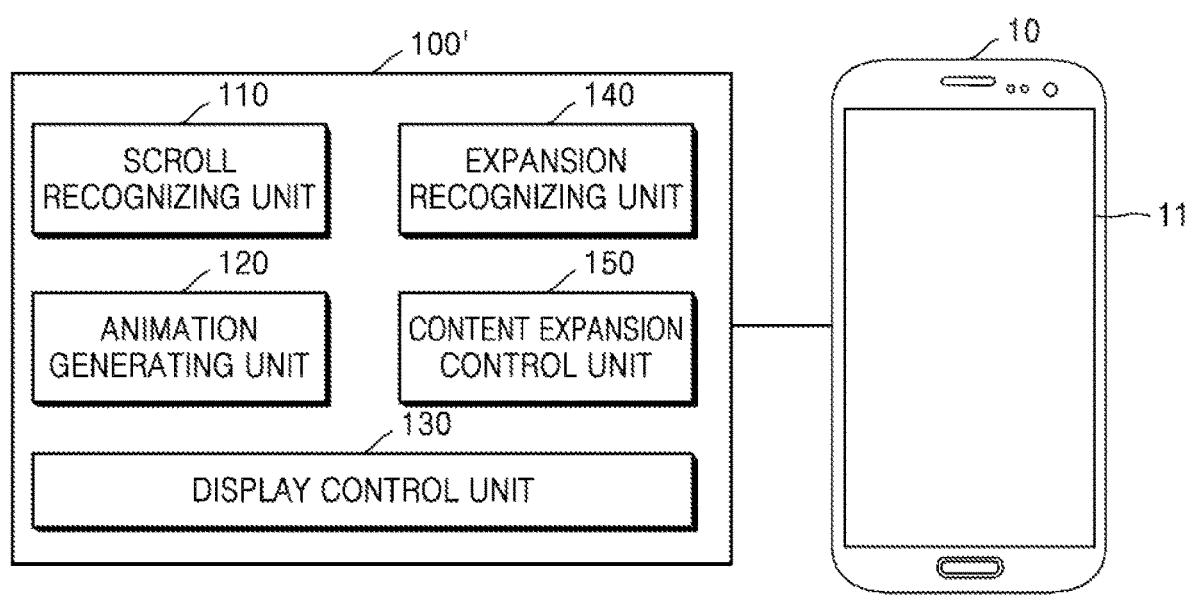
FIG. 1B is a schematic diagram showing a display control apparatus according to another embodiment.

FIG. 1B is a schematic diagram showing a display control apparatus 100' according to another embodiment of the present invention.

Compared to the display control apparatus 100 shown in FIG. 1A, the display control apparatus 100' shown in FIG. 1B further includes an expansion recognizing unit 140 and a content expansion control unit 150. Therefore, even if omitted below, any of the above descriptions regarding the components shown in FIG. 1A may also be applied to the terminal 10, the screen image 11, the display control apparatus 100', the scroll recognizing unit 110, and the animation generating unit 120 shown in FIG. 1B.

The display control apparatus 100' controls displaying of the screen image 11 on the terminal 10 and scrolling of a page displayed on the screen image 11. The display control apparatus 100' may adjust location of the page on the screen image 11 by scrolling the page when status of the page displayed on the screen image 11 is changed, For example, a plurality of content regions may be arranged on a page displayed on the screen image 11, where each of the content regions may include content. Each of contents may be expanded or shrunk. Contents may include basic contents exposed regardless of expansion of contents and expanded contents exposed when contents are expanded according to an expanding instruction from a user.

Expanded content refers to content that is normally folded and not displayed on the screen image 11 and, when a user inputs an expanding instruction, is unfolded and displayed on the screen image 11. When an expanded content is unfolded according to an expanding instruction of a user and a content region is expanded due to the unfolding of the expanded content, the display control apparatus 100' may change a location of the expanded content region on a screen image 11.

Hereinafter, the screen image 11 may refer to the entire display area of the terminal 10. However, the screen image 11 may also refer to at least a portion of a display area designated to display a page.

The expansion recognizing unit 140 recognizes a motion input by a user. For example, the expansion recognizing unit 140 may recognize a content expanding instruction input from a user. A content expanding instruction may be recognized as a user inputs a particular gesture with respect to content or selects a content expanding icon.

The content expansion control unit 150 controls expansion of content and expansion of a content region according to an expanding instruction. Expansion of content refers to displaying a hidden expanded content. The content expansion control unit 150 may expand a content region as content is expanded.

The content expansion control unit 150 adjusts locations of expanded content and an expanded content region on a screen image. For example, the content expansion control unit 150 may adjust location of a content region on a screen image (adjust location of a portion of a page displayed on the screen image) to include an expanded content region in the screen image as much as possible. To this end, a page scrolling instruction may be generated.

Hereinafter, changing a location of a content region does not refer to changing the location of the content region in a page, but refers to changing the location of the content region on the screen image. In other words, changing the location of the content region refers to changing the location of the content region on the screen image by scrolling the page.

The content expansion control unit 150 may expand content in a first direction and move a location of the content region in a second direction, which is opposite to the first direction. For example, content may be expanded downward, and, to efficiently display a content region, which is expanded downward, in a screen image, location of the content region may be moved upward. To this end, an instruction for scrolling a page downward may be generated.

For example, the content expansion control unit 150 may pull the upper end of a content region up to the upper end of a screen image, display the content region at the center of the screen image, or move the content region upward, such that the lower end of the content region is matched to the lower end of the screen image.

The content expansion control unit 150 may determine a first condition and/or a second condition for determining the location of a content region.

The first condition is a comparison between the size of a content region and the size of a screen image. For example, if the size of an expanded content region is greater than that of a screen image, the content expansion control unit 150 may locate the upper end of the content region at the upper end of the screen image or locate the lower end of the content region at the lower end of the screen image. On the other hand, if size of an expanded content region is smaller than that of a screen image, the content expansion control unit 150 may locate the content region at the center of the screen image. Here, the term size refers to an area or a length in at least one direction. For example, the term size may refer to the length in a direction in which a page is scrolled.

The second condition is a determination of whether an entire expanded content region is included in a current screen image. For example, when a content region is expanded, the content expansion control unit 150 determines whether at least a portion of the expanded content region is located outside a screen image and, only if a portion of the expanded content region is located outside a screen image, may change the location of the content region. If an entire expanded content region is included in a screen image, a user may view the entire content without scrolling a page, and thus the content expansion control unit 150 may be set to not change the location of the content region.

The first condition and the second condition may be utilized in various combinations. For example, the content expansion control unit 150 may determine the second condition first and, if the location of a content region is to be changed based on the result of determining the second condition, may further determine the first condition. For example, in case of changing the location of a content region based on satisfaction of the second condition, the size of an expanded content region may be compared to the size of a screen image. If the size of the expanded content region is greater than that of the screen image, the location of the content region may be changed to locate the upper end of the content region at the upper end of the screen image. If the size of the expanded content region is smaller than that of the screen image, the location of the content region may be changed to locate the content region at the center of the screen image or to locate the lower end of the content region at the lower end of the screen image.

The animation generating unit 120 may generate an animation to be applied to expanded content. For example, the animation generating unit 120 may generate an animation to be executed when expanded content is unfolded or folded. An animation may include various motions, such as movements, rotations, enlargements, and shrinking. For example, the animation generating unit 120 may generate a rotating animation to be applied to expanded content, where rotating directions opposite to each other may be respectively applied to folding and unfolding of the expanded content. In detail, the animation generating unit 120 may generate an animation to flip downward and unfold expanded content downward, and an animation to flip upward and fold the expanded content upward.

The display control unit 130 may display a page in which content regions are arranged on a screen image. When the size of a content region is expanded due to the expansion of content and the location of the content region on the screen image is determined by the content expansion control unit 150, the display control unit 130 scrolls a page to move the content region to the determined location on the screen image. The speed of scrolling the page may be set to a fixed value in advance. Alternatively, the speed of scrolling the page may be set based on a designated variable. For example, the speed of scrolling the page may be determined based on the amount of scrolling of the page. The speed of scrolling the page may be set to vary. For example, the speed of scrolling the page may be gradually increased or decreased.

Meanwhile, the display control unit 130 may apply an animation generated by the animation generating unit 120 to expanded content and display the animation. For example, when content is expanded and the expanded content is newly exposed on a screen image, the display control unit 130 may apply an animation to the expanded content and execute the animation, thereby providing a visual effect to the exposure of the expanded content. As a result, the newly exposed expanded content may draw attention of a user, and a visual effect occurs at the expansion of the content.

According to an embodiment, a user may expand content by inputting a content expanding instruction. When content is expanded, the location of the expanded content is automatically adjusted, and thus the user may conveniently view the content without manually scrolling a page.

Figure 2A:
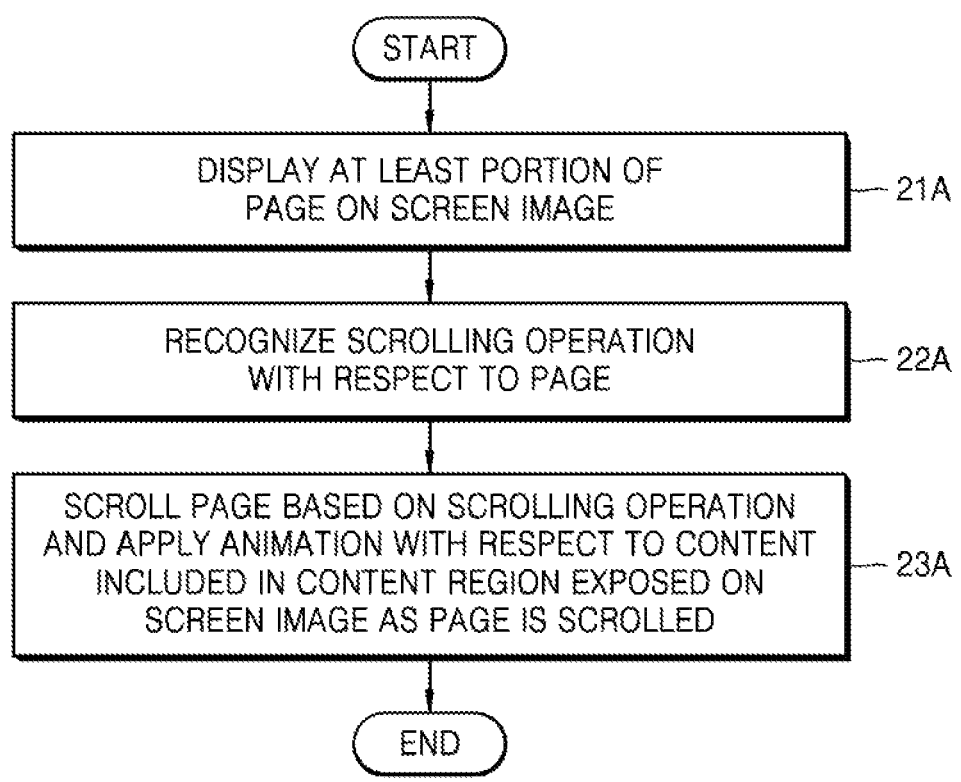
FIG. 2A is a flowchart showing a display control method according to one embodiment.

FIG. 2A is a flowchart describing a display control method according to an embodiment of the present invention.

The flowchart shown in FIG. 2A includes operations chronologically performed by the display control apparatus 100 shown in FIG. 1A. Therefore, even if omitted below, any of the above descriptions regarding the components shown in FIG. 1A may also be applied to the flowchart shown in FIG. 2A.

Referring to FIG. 2A, in operation 21A, the display control unit 130 of FIG. 1A displays at least a portion of a page on the screen image 11 of the terminal 10. One or more content regions including contents are arranged on the page.

In operation 22A, the scroll recognizing unit 110 of FIG. 1A recognizes a scrolling operation with respect to the page displayed on the screen image 11.

In operation 23A, the display control unit 130 of FIG. 1A scrolls the page according to the scrolling operation and applies an animation with respect to contents included in content regions exposed in the screen image 11 as the page is scrolled. The animation is generated by the animation generating unit 120 of FIG. 1A. An animation may include an operation for moving content to a pre-set location in a content region. In operation 23A, the display control unit 130 executes an animation regarding content included in a content region from a time point at which the corresponding content region is exposed in the screen image 11.

Figure 2B:
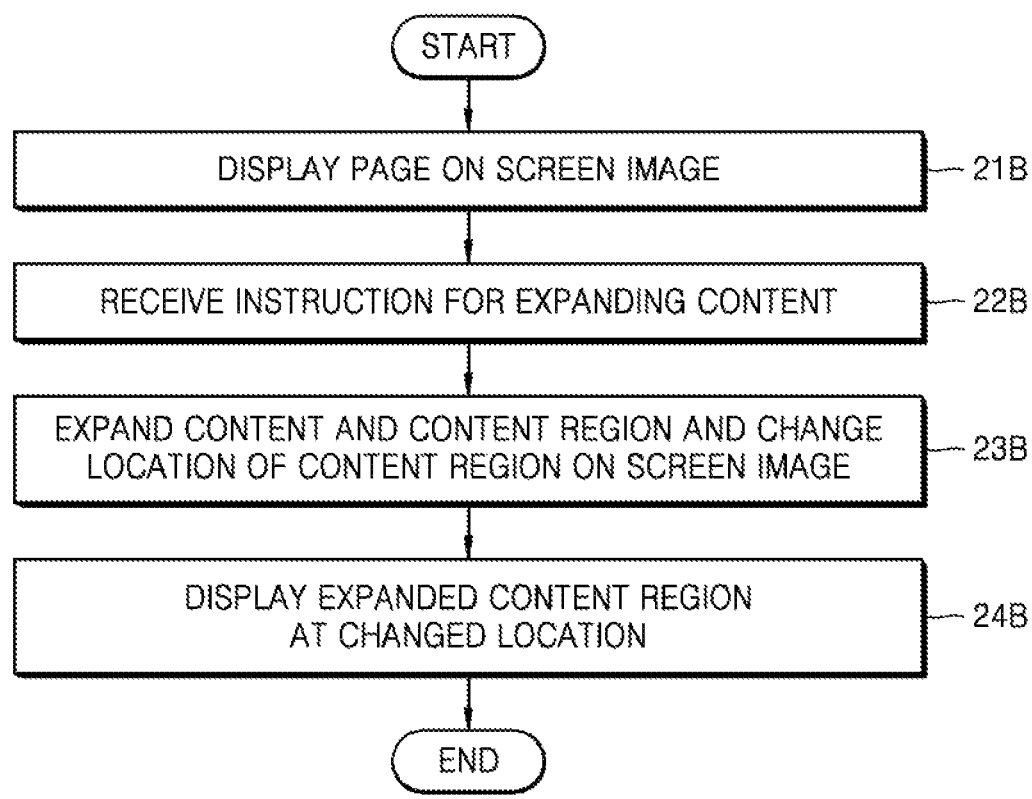
FIG. 2B is a flowchart showing a display control method according to another embodiment.

FIG. 2B is a flowchart describing a display control method according to another embodiment.

The flowchart shown in FIG. 2B includes operations chronologically performed by the display control apparatus 100' shown in FIG. 1B. Therefore, even if omitted below, any of the above descriptions regarding the components shown in FIG. 1B may also be applied to the flowchart shown in FIG. 2B.

Referring to FIG. 2B, in operation 21B, the display control unit 130 of FIG. 1B displays a page on the screen image 11 of the terminal 10. One or more content regions including contents are arranged in the page.

In operation 22B, the expansion recognizing unit 140 of FIG. 1B receives an instruction for expanding content.

In operation 23B, the content expansion control unit 150 expands content and a content region according to the instruction and determines the location of the content region on the screen image 11.

In operation 24B, the display control unit 130 displays the expanded content region at a changed location. To this end, the display control unit 130 scrolls the page.

Figure 3:
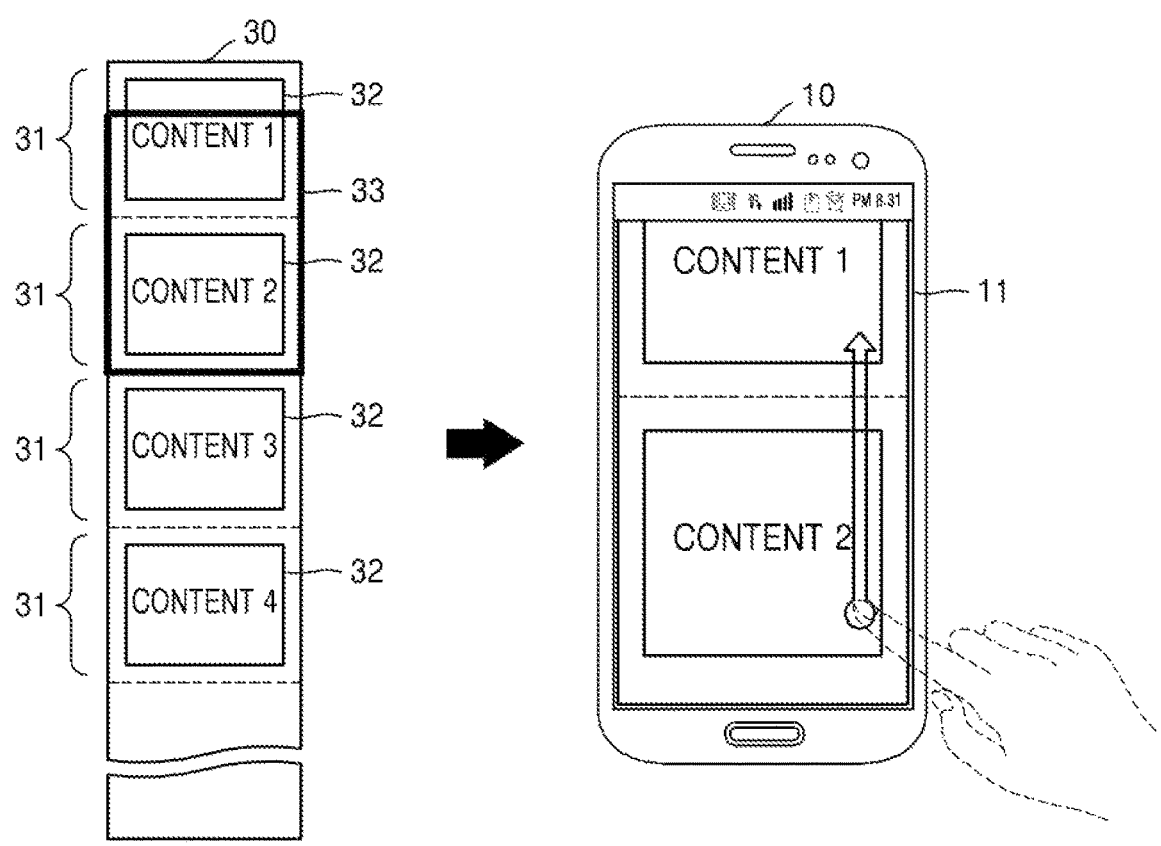
FIG. 3 is a diagram showing an example of a page and a screen image on which a portion of the page is displayed, according to one embodiment.

FIG. 3 is a diagram showing an example of a page and a screen image on which a portion of the page is displayed, according to an embodiment of the present invention.

Referring to FIG. 3, a page 30 includes a plurality of content regions 31, and content 32 is arranged at each of the content regions 31. FIG. 3 shows an example in which the plurality of content regions 31 are linearly arranged and form the page 30. A region 33 of the page 30 is displayed on the screen image 11 of the terminal 10. A user may input a scrolling operation with respect to the regions 33 of page 30 displayed at the terminal 10, thereby scrolling the page. FIG. 3 shows an example in which a user inputs a scrolling operation by inputting a drag by directly touching the screen image 11.

When the page 30 is scrolled and a content region 31 located outside the screen image 11 appears on the screen image 11 as the user inputs a scrolling operation, a designated animation may be applied to content included in the content region. In other words, a designated animation may be applied to content newly exposed on the screen image 11 as the page 30 is scrolled. The animation enables the user to concentrate on the newly exposed content and provides a visual effect to page scrolling.

Each of the contents 32 may be expanded, and the expanded content 32 may be shrunk again. To this end, the contents 32 may include basic content that is always displayed on the page 30 regardless of expansion of the content 32 and expanded content that is displayed on the page 30 when the content 32 is expanded according to an expanding instruction from a user. As the content 32 is expanded, the page 30 may be automatically scrolled on the screen image 11.

Figure 4:
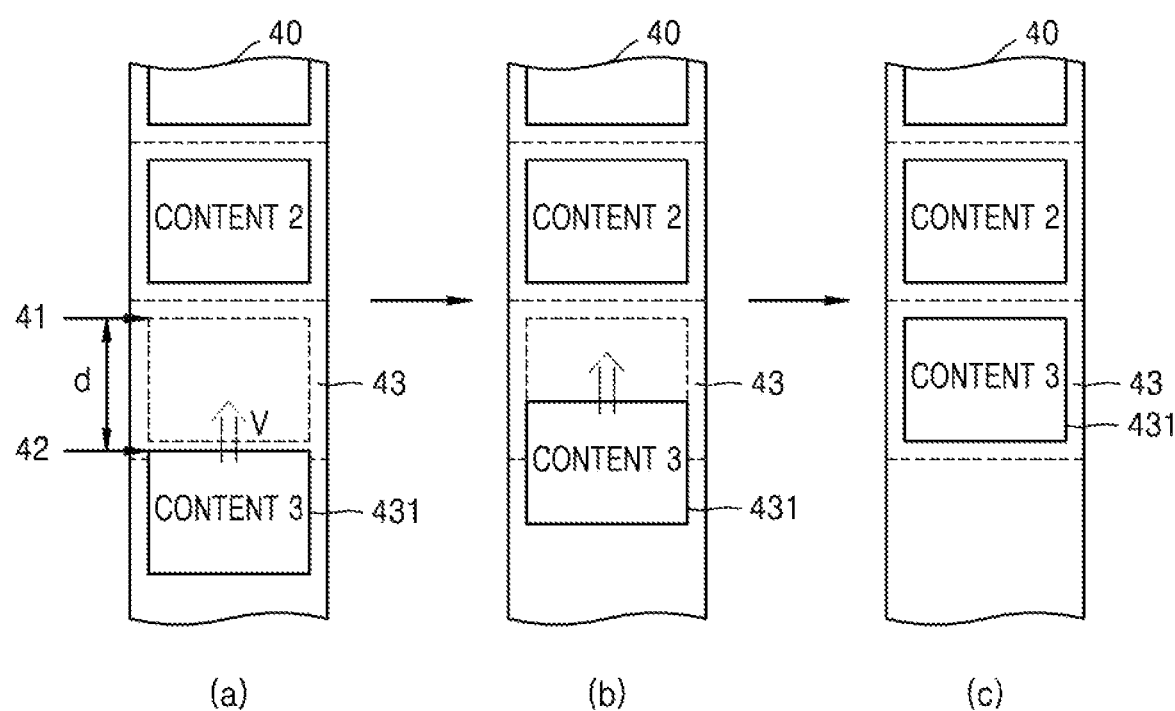
FIG. 4 is a diagram for describing an example of animations applied to contents, according to one embodiment.

FIG. 4 is a diagram showing an example of animations being applied to contents, according to an embodiment of the present invention.

An animation according to an embodiment may include an operation for moving content. In FIG. 4, (a) through (c) sequentially show a process in which content is moved as an animation is executed.

Referring to FIG. 4, an animation may include an operation for moving content by a designated distance d from a starting point 42 to an ending point 41. The ending point 41 is the original location of content 431 inside a content region 43, and the starting point 42 is a location distance d apart from the ending point 41.

According to an embodiment, properties of an animation may be determined based on the speed of scrolling a page or the speed of the scrolling operation input by a user. Here, the properties of an animation may include the speed, the distance, and the time for moving content.

From among properties of an animation, the time for moving content may be pre-set to a fixed value, e.g., 0.5 seconds. Furthermore, the speed v for moving content may be determined based on the speed of scrolling a page or the speed of a scrolling operation input by a user. The distance d for moving content may be calculated based on the time and the speed for moving the content 431 once the time and the speed for moving the content are determined.

Properties of an animation may further include the direction for moving content, where the direction for moving content may be determined based on the direction in which a page is scrolled. The direction for moving content may be identical to the direction in which a page is scrolled. The starting point 42 may be determined based on the distance d for moving the content 431, the ending point 41, and the direction for moving the content. In FIG. 4, a page 40 is scrolled upward (which means, the content under the screen image appears upward from the bottom of the screen image), where the starting point 42 is determined, such that content is moved upward along with the scrolling of the page.

The speed for moving content may be set to vary in correspondence to the movement of the content 431. For example, the speed for moving content may be set to increase or decrease in correspondence to the movement of the content 431. In this case, an average speed for moving content may be determined based on the speed of scrolling the page 40 or the speed of a scrolling operation input by a user. Alternatively, a momentary speed for moving content at the starting point 42 or the ending point 41 may be determined based on the speed of scrolling a page or a speed of a scrolling operation input by a user.

Figure 5:
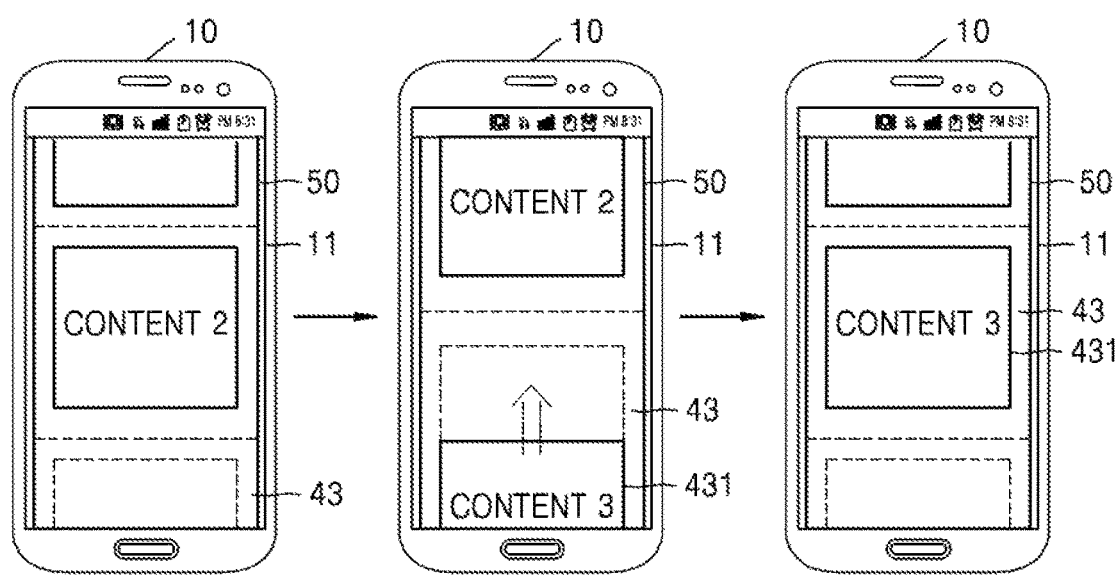
FIG. 5 is a diagram showing an example of a page to which the animation of FIG. 4 is applied being scrolled on a screen image of a terminal.

FIG. 5 is a diagram showing an example of a page 50 to which the animation of FIG. 4 is applied being scrolled on the screen image 11 of the terminal 10.

FIG. 5 shows that the page 50 is scrolled upward on the screen image 11 of the terminal 10. FIG. 5 shows that an animation is applied to the content 431 included in the content region 43 newly exposed as the page 50 is scrolled, and the content 431, to which the animation is applied, is moved on the page.

The animation applied to the content 431 may be executed from the time point at which the content region 43 is exposed on the screen image 11. As the animation is executed, the content 431 is exposed on the screen image 11 after the time point at which the content region 43 is exposed on the screen image, and the momentary scrolling speed at the time point at which the content 431 is exposed on the screen image may be faster than the speed of scrolling the page. In other words, the visual effect that looks as if the content 431 is scrolled faster than the page 50 occurs during the execution of the animation.

Figure 6:
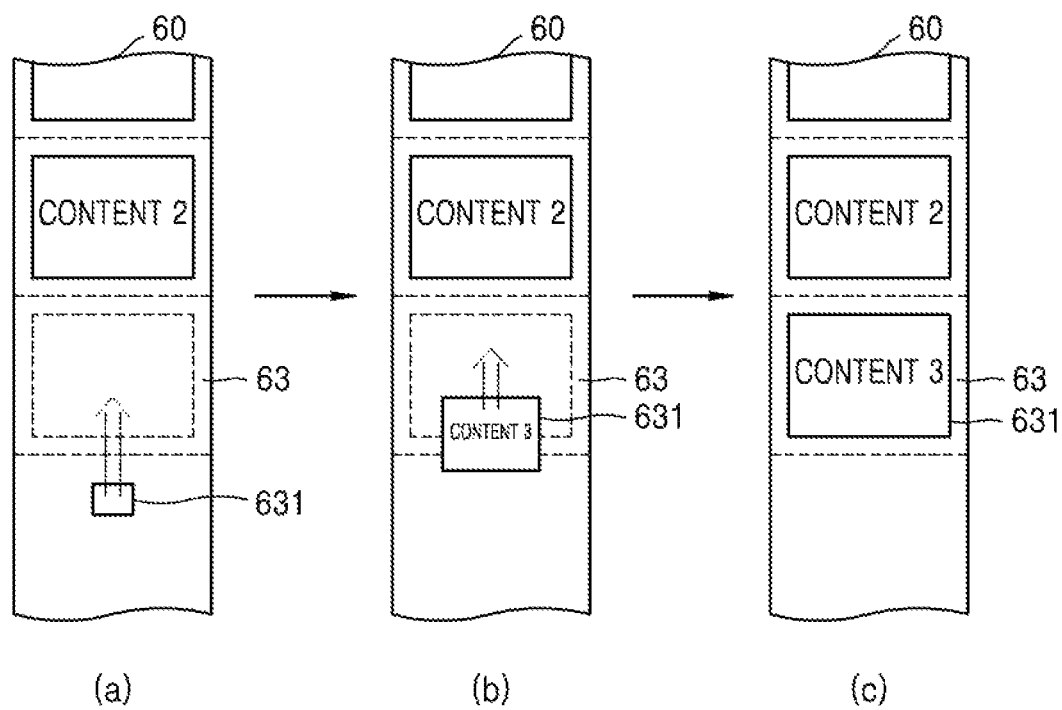
FIG. 6 is a diagram for describing another example of animations being applied to content, according to an embodiment.

FIG. 6 is a diagram for describing another example of animations applied to content, according to an embodiment of the present invention.

An animation according to an embodiment may include an operation for enlarging content. The animation shown in FIG. 6 includes both an operation for moving content and an operation for enlarging the content. In FIG. 6, (a) through (c) sequentially show a process in which content is enlarged and moved as an animation is executed.

Referring to FIG. 6, an animation may be applied to content 631 included in a content region 63 newly exposed as a page 60 is scrolled. The animation shown in FIG. 6 may be executed from a time point at which the content region 63 is exposed on a screen image of a terminal.

Figure 7:
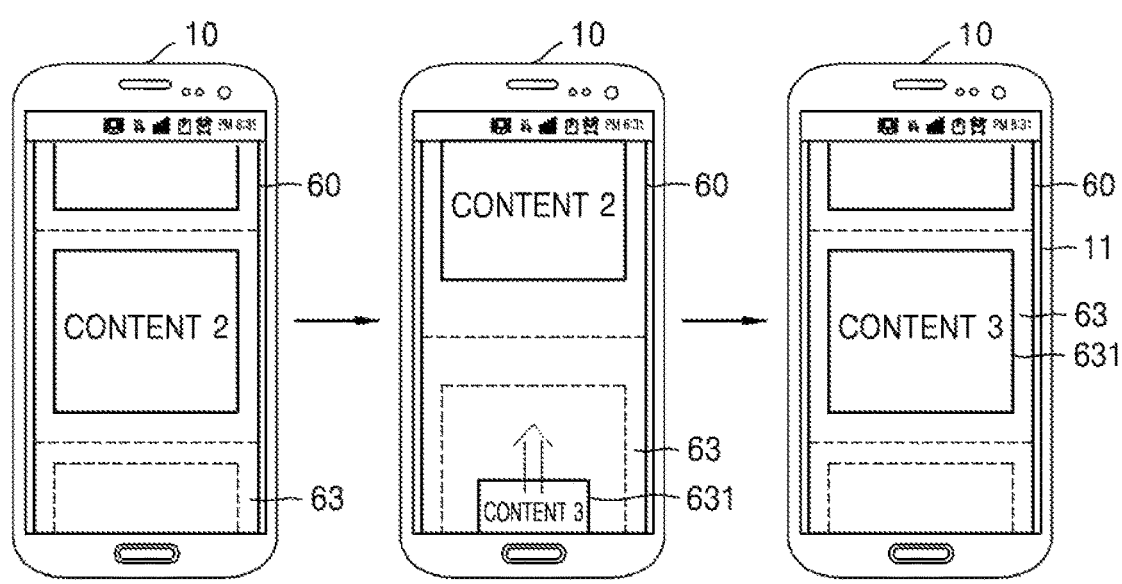
FIG. 7 is a diagram showing an example of a page to which the animation of FIG. 6 is applied being scrolled on a screen image of a terminal.

FIG. 7 is a diagram showing an example of the page 60 to which the animation of FIG. 6 is applied being scrolled on the screen image 11 of the terminal 10.

FIG. 7 shows that the page 60 is scrolled upward on the screen image 11 of the terminal 10. An animation is applied to the content 631 included in the content region 63 newly exposed as the page 10 is scrolled, and the content 631, to which the animation is applied, is enlarged and moved on the page.

The animation applied to the content 631 may be executed from the time point at which the content region 63 is exposed on the screen image 11 of the terminal 10. As the animation is executed, the content 631 is exposed on the screen image 11 after the time point at which the content region 63 is exposed on the screen image, and it will look as if the content 631 is scrolled faster than the page 60 and enlarged.

Figure 8:
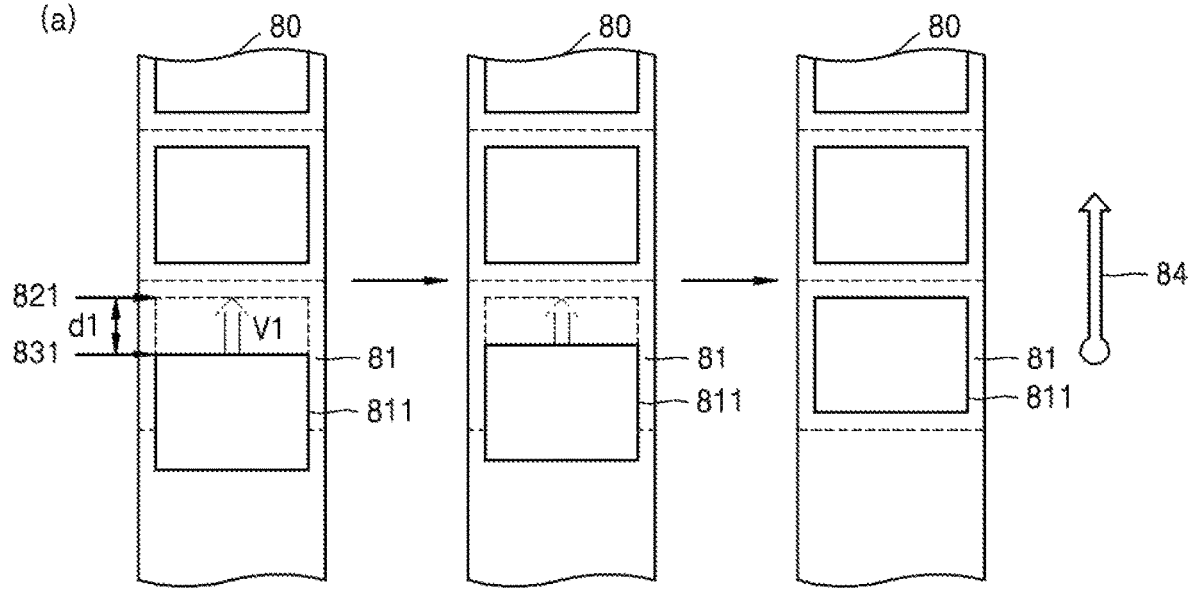
FIG. 8 is a diagram for describing an example of properties of an animation being differently set based on scrolling speeds.
Figure 8:
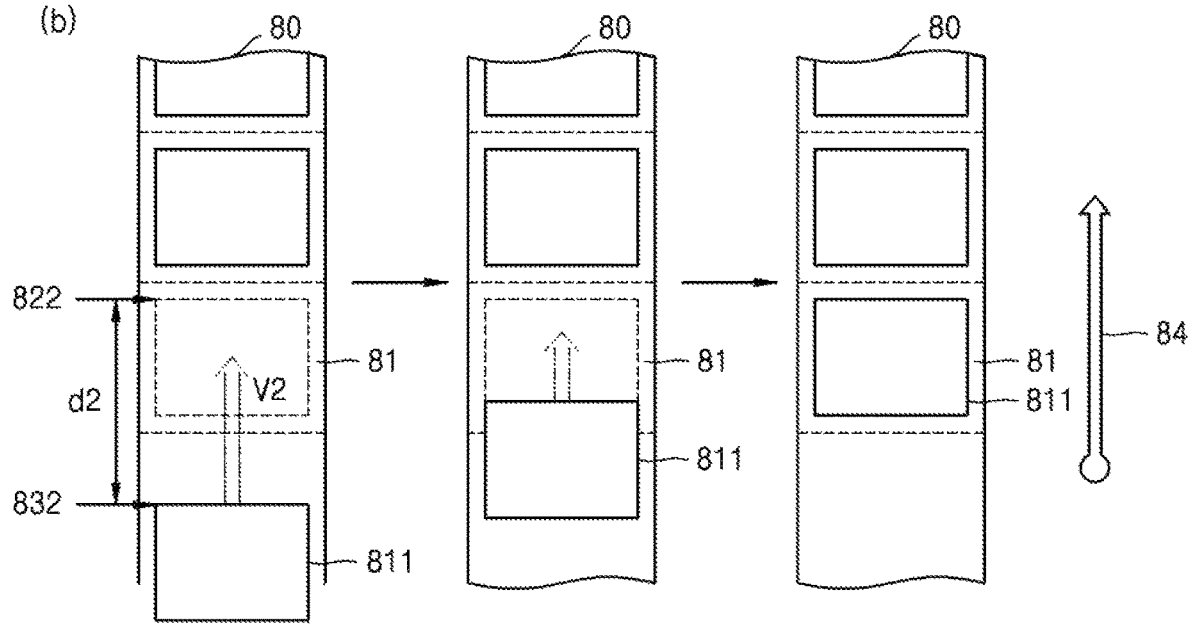

FIG. 8 is a diagram for describing that properties of an animation are differently set based on scrolling speeds.

FIG. 8 shows an example in which an animation is applied to content 811 included in a content region 81 exposed on a screen image as a page 80 is scrolled. In FIG. 8, (a) and (b) show animations that are differently configured based on the difference between speeds of scrolling operations or speeds of scrolling pages based on the scrolling operations. In FIG. 8, the speed of a scrolling operation 84 is faster in the example shown in (b) than the example shown in (a).

According to an embodiment, the animation generating unit 120 sets the same fixed moving time with respect to both in the case shown in (a) and (b) of FIG. 8. In other words, even if scrolling speeds differ from each other, moving times may be fixed values identical to each other. The animation generating unit 120 may set the moving speed in proportion to the scrolling speed. In FIG. 8, moving speed v1 of the case shown in (a) is set to be smaller than moving speed v2 of the case shown in (b).

The animation generating unit 120 may set the moving distance based on the moving speed and the moving time. In FIG. 8, moving distance d1 of the case shown in (a) is set to be shorter than moving distance d2 of the case shown in (b), because the moving speed v1 is set to be smaller than the moving speed v2.

The animation generating unit 120 may set a location a moving distance apart from the original location of content as a starting point for moving the content. In FIG. 8, a starting point 831 of the case shown in (a) is set to be closer to the original location of content 821 than a starting point 832 to the original location of content 822 of the case shown in (b), because the moving distance d1 is set to be smaller than the moving distance d2.

In FIG. 8, the direction in which content is moved is identical to a direction of the scrolling operation 84.

Referring to FIG. 8, in the case shown in (b), in which the speed of the scrolling operation 84 is faster than that in the case shown in (a), the moving distance d2 and the moving speed v2 for moving content are greater than those in the case shown in (a). Therefore, a visual effect that looks as if content is scrolled faster than the page 80 may be more significant in the case shown in (b) than in the case shown in (a).

Although pages are scrolled upward in the embodiments described above, the inventive concept is not limited thereto. According to size of a page, the page may be scrolled upward, downward, leftward, rightward, or in any direction of combinations thereof.

The embodiments described above may be applied not only to scrolling, but also enlarging and shrinking of a screen image. For example, an animation as described above may be applied with respect to content newly exposed on a screen image as the screen image is enlarged or shrunk.

Figure 9:
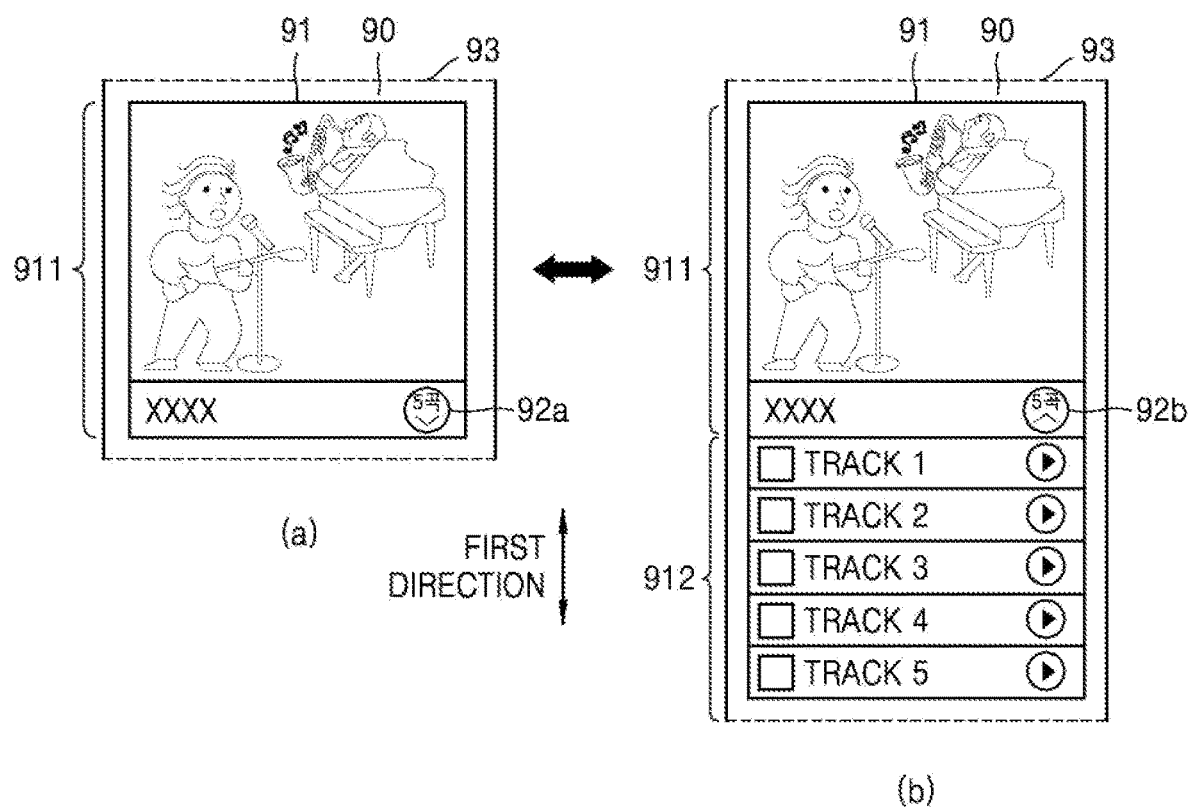
FIG. 9 is a diagram showing an example of a content region and content, according to one embodiment.

FIG. 9 is a diagram showing an example of a content region and content, according to an embodiment of the present invention.

Referring to FIG. 9, a content region 90 includes content 91. The content 91 includes basic content 911 that is displayed regardless of expansion of the content 91 and expanded content 912 that is unfolded according to an expanding instruction from a user and is folded according to a shrinking instruction from the user. In FIG. 9, (a) shows an example in which the expanded content 912 is not displayed, and (b) shows an example in which the content 91 is expanded and the expanded content 912 is displayed.

A user may unfold the expanded content 912 by clicking an expanding icon 92a and fold the expanded content 912 by clicking a shrinking icon 92b. As shown in FIG. 9, size of the content 91 varies based on whether the expanded content 912 is displayed, and thus size of the content region 90 including the content 91 also varies.

FIG. 9 shows an example in which the expanded content 912 is unfolded or folded in a first direction, and more particularly, is unfolded downward and folded upward. Hereinafter, it will be assumed that the expanded content 912 is unfolded or folded and a page 93 is scrolled in the first direction. However, the inventive concept is not limited thereto, and any of the descriptions of the present specification given based on the first direction may also be identically applied with respect to a second direction perpendicular to the first direction or a combination of the first direction and the second direction. In other words, the size of the content 91 may vary in the first direction and/or the second direction, and the page 93 may be scrolled in the first direction and/or the second direction.

While the state shown in (a) of FIG. 9 is being switched to the state shown in (b) of FIG. 9 as the expanding icon 92a is selected and the content 91 is expanded, an animation may be applied to the expanded content 912. For example, as an animation is applied the expanded content 912 may gradually extend, slide out from behind the basic content 911, or be flipped downward. Furthermore, any of various other animations for providing a visual effect may be applied as the expanded content 912 is newly displayed.

Figure 10:
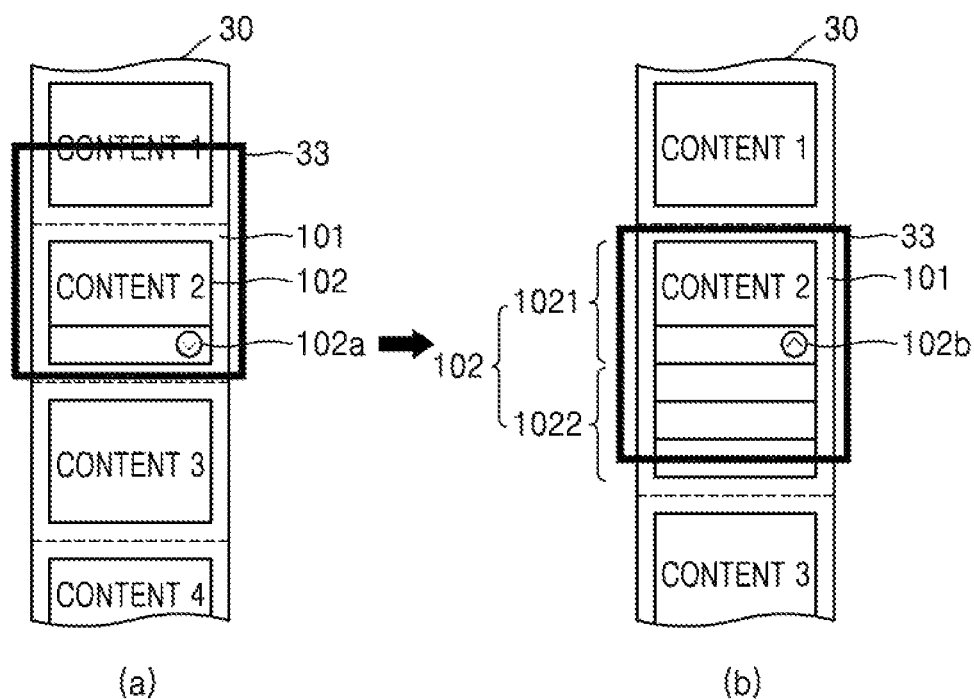
FIG. 10 is a diagram showing an example of a content region and content, according to another embodiment.

FIG. 10 is a diagram showing an example of a content region and content, according to an embodiment of the present invention.

Referring to FIG. 10, the page 30 includes a content region 101, and the content region 101 includes content 102. The content 102 includes basic content 1021 that is displayed regardless of expansion of the content 102 and expanded content 1022 that is unfolded according to an expanding instruction from a user. Meanwhile, due to the limit of the size of a display unit of a terminal, the entire page 30 may not be displayed on a screen image, and only a region 33 (referred to hereinafter as a 'screen image region 33') may be displayed on the screen image. The screen image region 33 may be moved as a page is scrolled.

In FIG. 10, (a) shows an example in which the expanded content 1022 is not displayed, and (b) shows an example in which the expanded content 1022 is displayed. A user may unfold the expanded content 1022 by clicking an expanding icon 102a and fold the expanded content 1022 by clicking a shrinking icon 102b. Size of the content 102 varies based on whether the expanded content 1022 is displayed, and thus size of the content region 100 including the content 102 also varies.

The content expansion control unit 150 of FIG. 1B according to an embodiment may unfold the expanded content 1022 based on an expanding instruction input by a user (click on the expanding icon 102a) and change the screen image region 33 displayed in a screen image at a terminal. Referring to FIG. 10, when the expanded content 1022 of the content 102 is unfolded, the content expansion control unit 150 of FIG. 1B may move the screen image region 33, such that the upper end of the content region 101 is located at the upper end of the screen image 11. Although the upper end of the content region 101 is at the middle of the screen image region 33 in the case shown in (a) of FIG.

10, the expanded content 1022 is unfolded and the upper end of the content region 101 is moved to the upper end of the screen image region 33 in the case shown in (b) of FIG. 10.

When a shrinking instruction from a user is recognized, that is, a shrinking icon 102*b* is clicked in the state shown in (b) of FIG. 10, the content expansion control unit 150 of FIG. 1B may fold the expanded content 1022. However, in this case, the content expansion control unit 150 may not change the screen image region 33. In other words, the upper end of the content 102 may still be located at the upper end of the screen image region 33. However, according to another embodiment, the content expansion control unit 150 of FIG. 1B may also be configured to suitably change the screen image region 33 even in the case of folding the expanded content 1022.

As described above, the content expansion control unit 150 of FIG. 1B may determine a first condition and/or a second condition and move the screen image region 33 based on the result of the determination. For example, FIG. 10 shows that the length of the expanded content 1022 in a scrolling direction is longer than the length of a screen image in the scrolling direction, and thus the content expansion control unit 150 of FIG. 1B may move the screen image region 33 to locate the upper end of the content 102 at the upper end of the screen image region 33.

Figure 11:
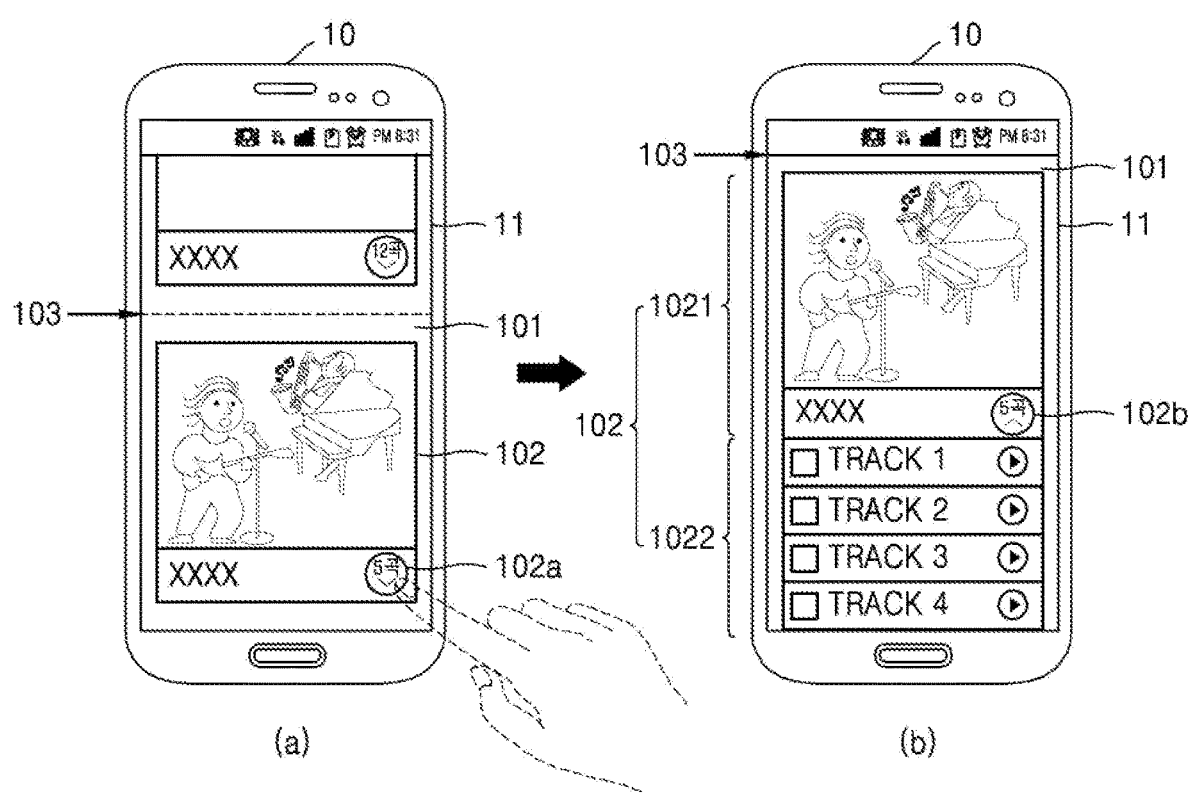
FIG. 11 is a diagram showing an example of a screen image region being displayed on a screen image of a terminal.

FIG. 11 is a diagram showing an example of the screen image region 33 being displayed on the screen image 11 of the terminal 10.

FIG. 11 shows a process that, as the content 102 is expanded on the screen image 11 of the terminal 10, a screen image region displayed on the screen image 11 is moved. When a user clicks the expanding icon 102*a* in the state shown in (a) of FIG. 11, the content 102 is expanded as shown in (b) of FIG. 11 and the expanded content 1022 is unfolded. Referring to FIG. 11, as the expanded content 1022 is unfolded, the size of the content region 101 is increased, the length of the content region 101 in a scrolling direction is increased, the screen image region is moved by the content expansion control unit 150 of FIG. 1B, and the location of the content region 101 displayed on the screen image 11 is changed.

If a region of a page displayed on the screen image 11 is not moved and the expanded content 1022 is unfolded in the state shown in (a) of FIG. 11, the expanded content 1022 expands out of the screen image 11, and thus it is necessary for a user to manually scroll a page to view the expanded content 1022.

When the expanded content 1022 is unfolded, the content expansion control unit 150 according to an embodiment moves the upper end 103 of the content region 101 to the upper end of the screen image 11, such that a user may conveniently view the corresponding content 102 including expanded content 1022. Therefore, when the 102 is expanded, a user may view most of the content 102 on the screen image 11 without directly scrolling a page.

Figure 12:
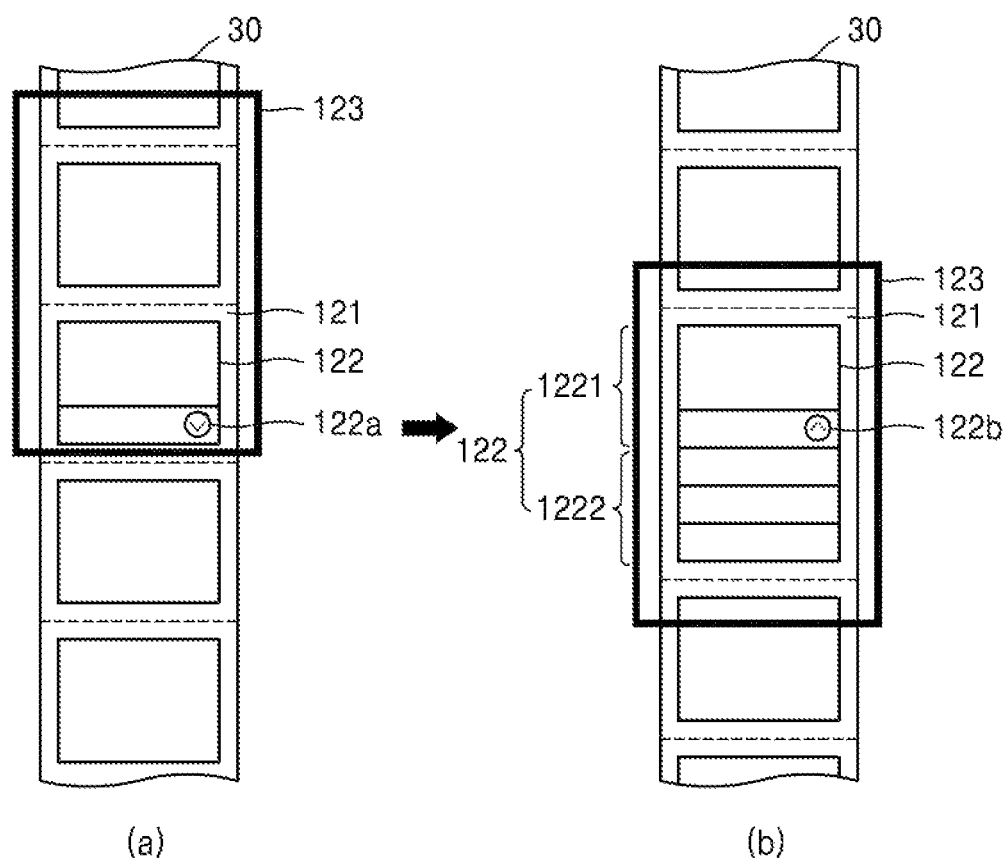
FIG. 12 is a diagram showing an example of a content region and content being displayed on a page, according to another embodiment.

FIG. 12 is a diagram showing an example of a content region 121 and content 122 being displayed on the page 30, according to another embodiment of the present invention.

FIG. 12 is a diagram for describing the content expansion control unit 150 adjusting location of a content region. Referring to FIG. 12, the page 30 includes a content region 121, and content 122 is displayed in the content region 121. An expanding icon 122*a* for inputting an instruction for expanding the content 122 is displayed at the content 122. The content 122 includes basic content 1221 that is displayed regardless of the expansion of the content 122 and expanded content 1222 that is unfolded according to an expanding instruction from a user. Only a region 123 may be displayed on a screen image. The screen image region 123 is moved as the page 30 is scrolled.

In FIG. 12, (a) shows an example in which the expanded content 1222 is not displayed, and (b) shows an example in which the expanded content 1222 is displayed. A user may unfold the expanded content 1222 by clicking an expanding icon 122*a* and fold the expanded content 1222 by clicking a shrinking icon 122*b*. The size of the content 122 varies based on whether the expanded content 1222 is displayed, and thus size of the content region 120 including the content 122 also varies.

The content expansion control unit 150 of FIG. 1B according to an embodiment may unfold the expanded content 1222 based on an expanding instruction input by a user (by clicking on the expanding icon 122*a*) and change the screen image region 123 displayed in a screen image at a terminal. Referring to FIG. 12, when the expanded content 1222 of the content 122 is unfolded, the content expansion control unit 150 of FIG. 1B may move the screen image region 123, such that the content region 121 is located at the center of the screen image region. Although the content region 121 is not located at the center of the screen image region 123 in the case shown in (a) of FIG. 12, the expanded content 1222 is unfolded and the content region 121 is moved to the center of the screen image region 123 in the case shown in (b) of FIG. 12.

When a shrinking instruction from a user is recognized, that is, a shrinking icon 122*b* is clicked in the state shown in (b) of FIG. 12, the content expansion control unit 150 of FIG. 1B may fold the expanded content 1222. However, in this case, the content expansion control unit 150 may not change the screen image region 123. However, the inventive concept is not limited thereto.

As described above, the content expansion control unit 150 of FIG. 1B may determine a first condition and/or a second condition and move the screen image region 123 based on the result of the determination. For example, in FIG. 12, the lower portion of the content 122 would be located outside the screen image region 123 when the content 122 is expanded, where the length of the expanded whole content 122 in a scrolling direction is shorter than the length of the screen image in the scrolling direction. Therefore, the content expansion control unit 150 of FIG. 1B may move the screen image region 123, such that the content 122 is located at the center of the screen image region 123. However, in this case, the location of the content 122 may be freely determined based on type of the content 122 and/or a user's preferences as long as the entire content 122 may be included in the screen image region 123.

Figure 13:
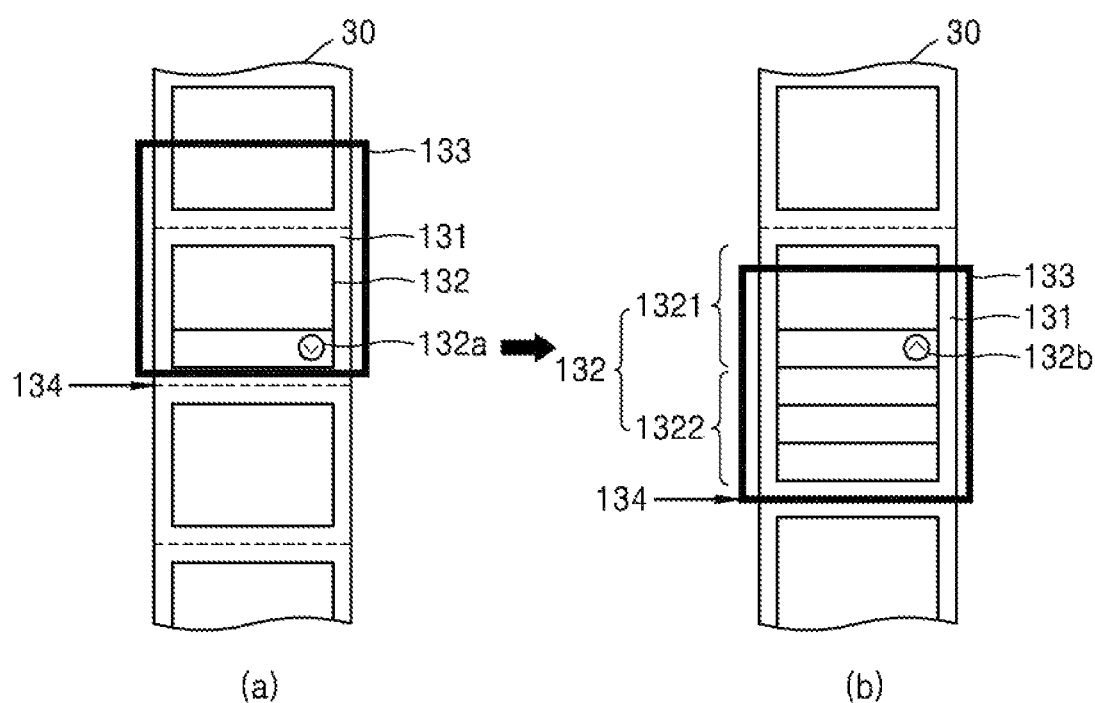
FIG. 13 is a diagram showing an example of a content region and content being displayed on a page, according to yet another embodiment; and, FIG. 14 is a flowchart showing a display control method according to another embodiment.

FIG. 13 is a diagram showing a content region 131 and content 132 being displayed on the page 30, according to another embodiment.

FIG. 13 is a diagram for describing another example of the content expansion control unit 150 adjusting the location of a content region. Referring to FIG. 13, the page 30 includes a content region 131, and content 132 is displayed in the content region 131. An expanding icon 132*a* for inputting an instruction for expanding the content 132 is displayed at the content 132. The content 132 includes basic content 1321 that is displayed regardless of the expansion of the content 132 and expanded content 1322 that is unfolded according to an expanding instruction from a user. Only a region 133, which is a portion of the page 30, may be displayed on a screen image. The screen image region 133 is moved as the page 30 is scrolled.

In FIG. 13, (a) shows an example in which the expanded content 1322 is not displayed, and (b) shows an example in which the expanded content 1322 is displayed. A user may unfold the expanded content 1322 by clicking an expanding icon 132a and fold the expanded content 1322 by clicking a shrinking icon 132b. The size of the content 132 varies based on whether the expanded content 1322 is displayed, and thus the size of the content region 130 including the content 132 also varies.

FIG. 13 is a diagram showing a modification of the embodiment shown in FIG. 10, where the content expansion control unit 150 moves the screen image region 133 to locate the lower end 134 of the content 132 is located at the lower end of the screen image region 133.

Figure 14:
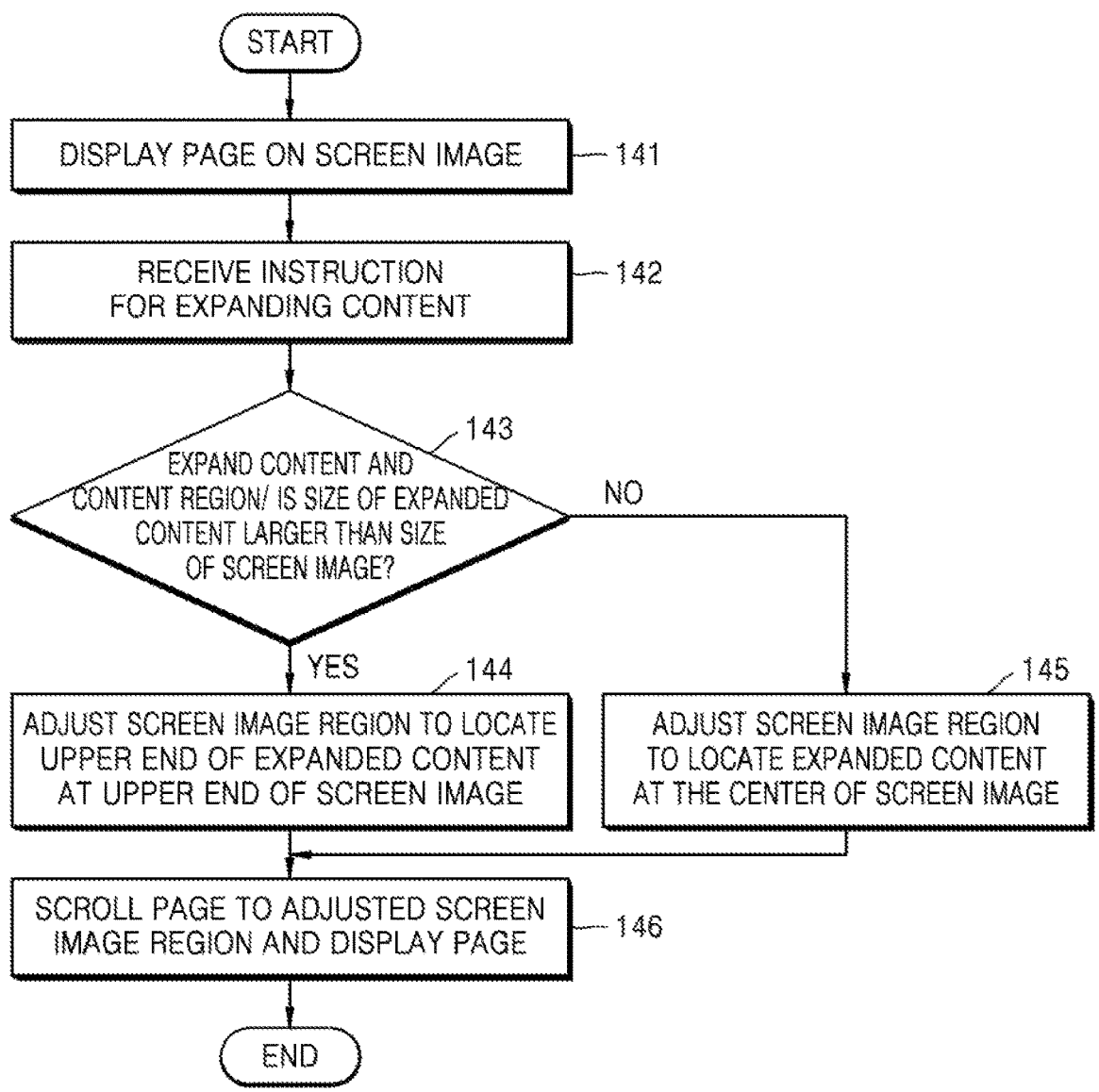

FIG. 14 is a flowchart showing a display control method according to another embodiment of the present invention.

Various embodiments related to movements of screen image regions based on expansion of contents are described above with reference to FIGS. 9 through 13. For example, a screen image region is moved to locate the upper end of content at the upper end of the screen image region according to the embodiment shown in FIGS. 10 and 11, a screen image region is moved to locate content at the center of the screen image region according to the embodiment shown in FIG. 12, and a screen image region is moved to locate the lower end of content at the lower end of the screen image region according to the embodiment shown in FIG. 13.

Referring to FIG. 14, the content expansion control unit 150 according to an embodiment may select one from among the methods of moving screen image regions shown in FIGS. 9 through 13 based on determinations of conditions in consideration of the size of a screen image and the size of a content region, and move a screen image region based on a selected method.

First, in operation 141, the display control unit 130 of FIG. 1B displays a screen image region, which is at least a portion of a page, on a screen image. Next, in operation 142, the expansion recognizing unit 140 of FIG. 1B receives an instruction for expanding content. Next, in operation 143, the content expansion control unit 150 of FIG. 1B expands the content and a content region based on the instruction and determines whether the size of the entire content is larger than size of the screen image (first condition). If the size of the entire content is larger than the size of the screen image, the method proceeds to operation 144. If the size of the entire content is smaller than the size of the screen image, the method proceeds to operation 145.

In operation 144, the content expansion control unit 150 adjusts the screen image region to locate the upper end of the content at the upper end of the screen image. In operation 145, the content expansion control unit 150 may adjust the screen image region to locate the content at the center of the screen image.

If the size of the entire content is larger than the size of the screen image, the screen image region is set to display the most important portion of the content region to a user within limited size of the screen image or to most efficiently display the content region. For example, the upper end of the content region is located at the upper end of the screen image region. On the contrary, if size of the entire content is smaller than size of the screen image, the location of the content on the screen image region may be set based on any method as long as the entire content region is displayed within the screen image. Therefore, the screen image region may be set based on any of various methods in consideration of situations and conditions for practicing the present embodiment. For example, the screen image region may be set to locate the content region at the center of the screen image.

In operation 146, the display control unit 130 scrolls a page to the adjusted screen image region and displays the page.

Although not shown in FIG. 14, a second condition may be further determined in operation 143. For example, when a content region is expanded, the content expansion control unit 150 may further determine whether at least a portion of the expanded content region is located outside the screen image. The content expansion control unit 150 may determine the first condition in operation 143 of FIG. 14 as described above only when at least a portion of the expanded content region is located outside the screen image. If no portion of the expanded content region is located outside the screen image, it is not necessary to move the location for displaying the content region, and thus the process may be terminated.

In the above embodiments, when the screen image region is moved under the control of the content expansion control unit 150, the display control unit 130 may move the screen image region by smoothly scrolling a page. For example, when the screen image region is moved based on the expansion of content, the display control unit 130 may smoothly move the screen image region by scrolling the page from the screen image region prior to the movement to a screen image region after the movement. The scrolling speed may be set to a fixed value or may vary according to the distance for moving the screen image region. Alternatively, the scrolling speed may be set to a fixed value or may vary regardless of the distance for moving the screen image region.

In the above embodiments, it is shown that basic content may include cover art and basic information of a music album, and expanded content may include tracks included in the music album. However, embodiments of the inventive concept may also be applied to various other cases. For example, basic content may include postings of an internet SNS, whereas expanded content may include replies regarding the postings. When a user unfolds the expanded content to read replies, the display control apparatus according to an embodiment may control the location of contents on a screen image, thereby effectively displaying the expanded content within the screen image having a limited size. A user may conveniently view expanded contents without directly scrolling a page.

As described above, according to the display control apparatus, the display control method, and a computer readable recording medium having recorded thereon a computer program for implementing the display control method according to the one or more of the above exemplary embodiments, a user's concentration on information exposed on a screen image as a page is scrolled may be improved.

Since an animation is applied to content exposed on a screen image as a page is scrolled, a user may concentrate on the content exposed as the page is scrolled.

According to the display control apparatus, the display control method, and a computer readable recording medium having recorded thereon a computer program for implementing the display control method according to the one or more of the above exemplary embodiments, a visual effect occurs when a scrolling operation is performed, and the visual effect improves a user's satisfaction.

In addition, other embodiments can also be implemented through computer readable code/instructions in/on a medium, e.g., a computer readable medium, to control at least one processing element to implement any above described embodiment. The medium can correspond to any medium/media permitting storage and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to one or more exemplary embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that the exemplary embodiments described herein should be considered in a descriptive sense only and not for purposes of limitation. Descriptions of features or aspects within each embodiment should typically be considered as available for other similar features or aspects in other embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A method, using a processor, for controlling display of a page on a screen of a terminal, comprising:
   displaying a portion of the page on the screen of the terminal, wherein the page includes a first content region and a second content region arranged adjacent to the first content region, the first content region including a first content as being displayed on the screen, the second content region including a second content as being not displayed on the screen;
   recognizing a scrolling operation with respect to the page; and
   scrolling the page at a scrolling speed based on the scrolling operation,
   wherein the scrolling of the page includes:
      displaying that the first content is moved at the scrolling speed on the screen and the second content starts to be exposed on the screen;
      displaying that after the second content starts to be exposed on the screen, a size of the second content gradually increases while a size of the first content is maintained and the second content moves to a designated location in the second content region on the page at a moving speed faster than the scrolling speed while the scrolling speed of the first content is maintained so that a distance between the first content and the second content gradually decreases;
      displaying that when the second content reaches the designated location, the size of the second content becomes same as an original size of the second content; and
      displaying that after the second content reaches the designated location, the first content and the second content are moved together at the scrolling speed on the screen.

2. The display controlling method of claim 1, wherein at least one of the moving speed, a moving distance, and a moving time of the second content is determined based on the scrolling speed.

3. The display controlling method of claim 2, wherein the moving distance of the second content, which is a distance from a starting location where the second content is on the page at a time when the second content starts to be exposed on the screen to the designated location, is determined based on the moving speed of the second content.

4. The display controlling method of claim 2, wherein the moving time of the second content, which is a time when the second content moves to the designated location after the second content starts to be exposed on the screen, is a pre-set fixed time,
   the moving speed of the second content is set based on the scrolling speed, and
   the moving distance of the second content is determined based on the moving time of the second content and the moving speed of the second content.

5. The display controlling method of claim 2, wherein the moving distance of the second content is a pre-set fixed distance, and
   the moving speed of the second content is set based on the scrolling speed.

6. The display controlling method of claim 2, wherein the moving speed of the second content increases or decreases as the second content is moved to the designated location, and
   an average moving speed of the second content is set based on the scrolling speed.

7. The display controlling method of claim 1, wherein the scrolling operation is input by dragging on a touch screen of the terminal, and the page is scrolled based on direction and speed of the dragging.

8. The display controlling method of claim 1, wherein a transparency of the second content gradually changes from a first transparency to a second transparency when the second content is moved to the designated location after being exposed on the screen.

9. The display controlling method of claim 1, wherein the size of the second content gradually increases from a smaller size to the original size of the second content as the second content is moved to the designated location.

10. The display controlling method of claim 1, wherein an increasing speed of the size of the second content is set in proportion to the scrolling speed.

11. A display control apparatus for controlling display of a page on a screen of a terminal, comprising:
   a processor to execute the steps comprising:
   displaying a portion of the page on the screen of the terminal, wherein the page includes a first content region and a second content region arranged adjacent to the first content region, the first content region including a first content as being displayed on the screen, the second content region including a second content as being not displayed on the screen;
   recognizing a scrolling operation with respect to the page; and
   scrolling the page at a scrolling speed based on the scrolling operation,
   wherein the scrolling of the page includes:
      displaying that the first content is moved at the scrolling speed on the screen and the second content starts to be exposed on the screen;
      displaying that after the second content starts to be exposed on the screen, a size of the second content gradually increases while a size of the first content is maintained and the second content moves to a designated location in the second content region on the page at a moving speed faster than the scrolling speed while the scrolling speed of the first content is maintained so that a distance between the first content and the second content gradually decreases;

displaying that when the second content reaches the designated location, the size of the second content becomes same as an original size of the second content; and displaying that after the second content reaches the designated location, the first content and the second content are moved together at the scrolling speed on the screen.

12. The display control apparatus of claim 11, wherein at least one of the moving speed, a moving distance, and a moving time of the second content is determined based on the scrolling speed.

13. The display control apparatus of claim 12, wherein the moving distance of the second content, which is a distance from a starting location where the second content is on the page at a time when the second content starts to be exposed on the screen to the designated location, is determined based on the moving speed of the second content.

14. A non-transitory computer readable recording medium having recorded thereon a computer program for controlling display of a page on a screen of a terminal, the program enabling a computer to execute the steps comprising:

displaying a portion of the page on the screen of the terminal, wherein the page includes a first content region and a second content region arranged adjacent to the first content region, the first content region including a first content as being displayed on the screen, the second content region including a second content as being not displayed on the screen;

recognizing a scrolling operation with respect to the page; and scrolling the page at a scrolling speed based on the scrolling operation, wherein the scrolling of the page includes:

displaying that the first content is moved at the scrolling speed on the screen and the second content starts to be exposed on the screen;

displaying that after the second content starts to be exposed on the screen, a size of the second content gradually increases while a size of the first content is maintained and the second content moves to a designated location in the second content region on the page at a moving speed faster than the scrolling speed while the scrolling speed of the first content is maintained so that a distance between the first content and the second content gradually decreases;

displaying that when the second content reaches the designated location, the size of the second content becomes same as an original size of the second content; and displaying that after the second content reaches the designated location, the first content and the second content are moved together at the scrolling speed on the screen.

15. The recording medium of claim 14, wherein at least one of the moving speed, a moving distance, and a moving time of the second content is determined based on the scrolling speed.

16. The recording medium of claim 15, wherein the moving distance of the second content, which is a distance from a starting location where the second content is on the page at a time when the second content starts to be exposed on the screen to the designated location, is determined based on the moving speed of the second content.

* * * * *